UNITED STATES PATENT OFFICE.

FREDERICK E. BLAISDELL, OF LONDON, HAMPSTEAD, ENGLAND, ASSIGNOR TO THE COMMERCIAL DIE PRESS SYNDICATE LIMITED, OF LONDON, ENGLAND.

WIPER FOR PRINTING-PLATES.

No. 799,138.     Specification of Letters Patent.     Patented Sept. 12, 1905.

Application filed May 23, 1904. Serial No. 209,415.

*To all whom it may concern:*

Be it known that I, FREDERICK ELIJAH BLAISDELL, of 64 Finchley road, Hampstead, London, England, have invented a certain new and useful Improved Wiper for Printing-Plates; and I do hereby declare the following to be a full, clear, and exact description of the invention, such as will enable others skilled in the art to which it appertains to make and use the same.

The present invention relates to an improved wiper in the form of either a pad, a strip, or of an endless band for cleaning the surfaces of intaglio printing-plates; and it consists in the material of such wiper. The specification of previous Letters Patent, No. 731,324, June 16, 1903, granted to me pointed out the inutility of paper as a wiper material. It is disqualified for the purpose by its capacity for absorbing some of the ink, and which ink cannot be recovered by the impracticability of scraping it closely, because such scraping would detach paper fibers which would be mixed with the scraped-off ink and spoil it and by its being spoiled for further wiping purposes by the presence of the absorbed ink. The said specification proposed a wiper consisting of superposed and united layers of the mucous membrane of animals as a material and superposition and union being necessary to impart the desired degree of strength to the wiper, so that the desired thickness or tensional strength of wiper would be attained by virtue of its being in several layers, as distinguished from it being in a single layer.

According to the present invention the material is any one that possesses the following properties or the most important of them: First, imperviousness to inks used in plate-printing; second, imperviousness to the solvents used in removing such inks from the respective wipers; third, sufficient hardness to prevent the surface of the wiper embossing itself into the intaglio lines of the printing-plate; fourth, capacity for being cast or pressed to the desired form against a smooth surface and for taking a smooth surface therefrom at the same time; fifth, capacity for pieces of it being welded together end to end to attain the desired length or shape; sixth, possessing the desired thickness or tensional strength without the superposition or union mentioned above; seventh, capacity for removal by erasure of such slight scratches as are caused by grit in the ink; eighth, capacity for a bad or damaged piece in the wiper being cut out and replaced by grafting a piece of new material onto the old; ninth, capacity for having its working surface renewed by grinding and polishing, and, tenth, absence of native grit and native fiber.

I have discovered that all the properties above enumerated are possessed by celluloid, and for that reason celluloid may be taken as a typical material for the purpose of the present invention, although it is to be distinctly understood that the adoption of it does not exclude others, inasmuch as any material that possesses any of the combinations of properties hereinafter claimed is to be taken as falling within the scope of the said invention.

I claim—

1. A wiper made of material substantially impervious to inks used in plate-printing and to the solvents used in removing such inks from the wiper and sufficiently hard to prevent the surface of the wiper embossing itself into the intaglio lines of the printing-plate.

2. A wiper made of material substantially impervious to inks used in plate-printing and to the solvents used in removing such inks from the wiper and capable of being cast or pressed to the desired form against a smooth surface and of taking a smooth surface therefrom at the time it is so cast or pressed.

3. A wiper made of material substantially impervious to inks used in plate-printing and to the solvents used in removing such inks from the wiper and possessing the desired thickness or tensional strength by virtue of its being in a single layer.

4. A wiper made of material substantially impervious to inks used in plate-printing and to the solvents used in removing such inks from the wiper, the nature of the material being such that such slight scratches as are caused by grit in the ink can be removed by erasure.

5. A wiper made of material substantially impervious to inks used in plate-printing and to the solvents used in removing such inks from the wiper, the nature of the said material being such that a bad or damaged piece of the wiper can be cut out and replaced by grafting a piece of new material onto the old.

6. A wiper made of material substantially impervious to inks used in plate-printing and to the solvents used in removing such inks from the wiper, the nature of the material being such that its working surface can be renewed by grinding and polishing.

7. A wiper made of material substantially impervious to inks used in plate-printing and to the solvents used in removing such inks from the wiper, the material being such that it is naturally free of grit or fiber.

In witness whereof I have hereunto set my hand in the presence of two witnesses.

FREDERICK E. BLAISDELL.

Witnesses:
 CHAS. S. WOODROFFE,
 WARWICK HY. WILLIAMS.